ROBERT E. COLE
DONALD J. ARGANBRIGHT
INVENTORS

BY Gary D. Fields
Robert W. Hampton

ATTORNEYS

Jan. 5, 1971  R. E. COLE ET AL  3,553,056
STRIP SPLICING DEVICE

Filed Aug. 23, 1967  7 Sheets-Sheet 5

ROBERT E. COLE
DONALD J. ARGANBRIGHT
INVENTORS

BY Gary D. Fields
Robert W. Hampton
ATTORNEYS

United States Patent Office 3,553,056
Patented Jan. 5, 1971

3,553,056
STRIP SPLICING DEVICE
Robert E. Cole and Donald J. Arganbright, Rochester, N.Y., assignors to Eastman Kodak Company, Rochester, N.Y., a corporation of New Jersey
Filed Aug. 23, 1967, Ser. No. 662,685
Int. Cl. B31f 5/00; G03d 15/04
U.S. Cl. 156—505                                      13 Claims

ABSTRACT OF THE DISCLOSURE

A semi-automatic device in which strips to be spliced are positioned by hand and the ends of the strips are cut off and perforated by a hand-operated cutoff handle is provided. Release of the cutoff handle initiates the automatic cycle in which the ends of the strips are brought into abutment and a splicing tape crimped, fed, applied and cut to complete the splice. The support tables for the strips are moved by means of a motor and slip-clutch arrangement to position the film ends and initiate the taping operation. By means of a slip clutch the tables are held in positive engagement during the entire taping operation. This avoids the necessity of turning the motor off and on again within a second or so and protects the motor from burning out during the application of the tape.

CROSS-REFERENCE TO RELATED APPLICATIONS

The tape applicator utilized with this invention is more fully disclosed in copending application Ser. No. 662,686, filed Aug. 23, 1967. The tape cutter mechanism is fully disclosed in copending application Ser. No. 662,687, filed Aug. 23, 1967.

BACKGROUND OF THE INVENTION

This invention relates to apparatus for joining ends of two strips of indefinite length by means of a joining adhesive web which is applied to the abutting ends to form a splice and is severed from its supply means. One use for such long lengths is in a film processing or treating machine, where the individual short lengths of film are spliced together to form a long length to be fed into the machine.

There are many prior-art devices for forming splices. Each of these has certain disadvantages, however. For instance, in many such devices a great many of the operations necessary to form the splice must be performed by hand so that the accuracy of the splice depends to a great extent upon the skill of the workman using the device. In addition, it is often necessary to align the film by hand, and unless this is done with precision, a less-than-adequate splice may result. Furthermore, the prior-art devices do not perform all of the steps of cutting, punching sprocket holes, positioning the ends of the film, crimping the splicing tape so that it is stiff enough for feeding, feeding the tape, applying the tape and cutting.

SUMMARY OF THE INVENTION

The apparatus of this invention includes a hand-operated cutter that cuts the ends of the two strips, which may be photographic film, to be spliced and, at the same time, punches the appropriate sprocket hole. Release of the cutter initiates an automatic operation during which movable tables that support the respective film strips are driven together to position the ends of the strips in abutting relationship. The tables are held in this position by means of a friction clutch while a splicing tape is applied to the abutting ends of the strip by a roller that moves across the splice to apply the tape and then holds the end of the tape while a length of the tape for the next splicing operation is stripped from the roll and crimped, ready to feed during the next splicing operation. After the tape has been stripped from the roll, the cutter mechanism severs it and the roller applies the trailing end of the severed strip to the splice before being raised from the splice. Finally, the tables are driven apart and the motor shut off to complete the cycle.

DESCRIPTION OF THE PREFERRED EMBODIMENT

Figure 1:
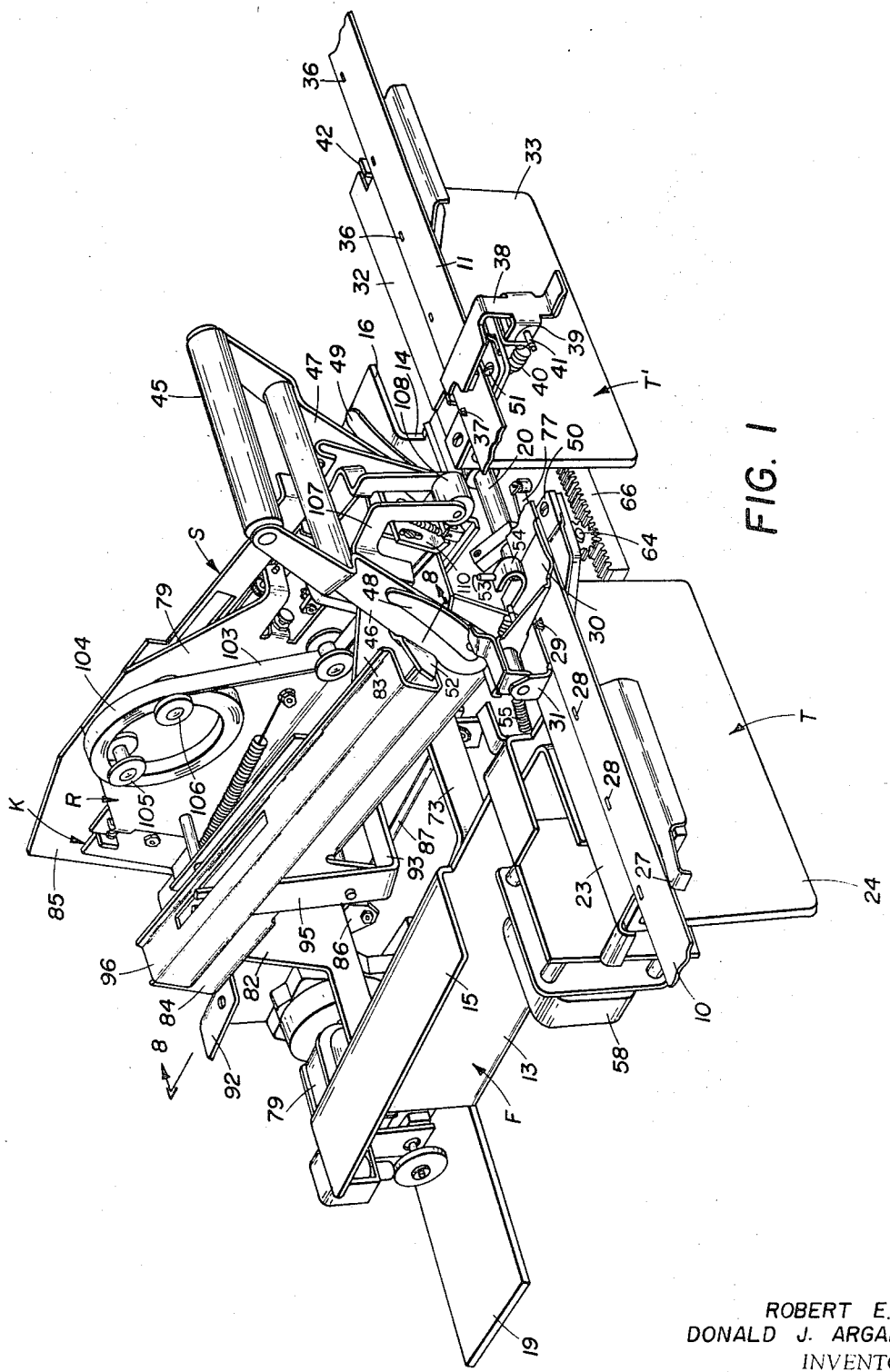
FIG. 1 is a perspective view of the strip splicing device of this invention, with the tables in open position and film strips positioned on them prior to being spliced.

In accordance with this invention, the strip splicing device includes movable tables T and T', as shown in FIG. 1, which are adapted to support the ends of two strips, such as film strip 10 on table T, which may be fed onto the table from a supply roll (not shown) and film strip 11 mounted on table T', which may be attached to a film take-up reel (not shown). These tables are mounted for reciprocal movement across the front of frame F so that the film ends may be brought into abutting relationship for splicing, as described below. The tape splicer S is mounted within frame F and includes a knife carriage K that reciprocates along the frame in a direction perpendicular to the movement of tables T and T' and a tape-roll carriage R that reciprocates within the knife carriage for stripping the tape from the roll, as more fully described below.

Figure 2:
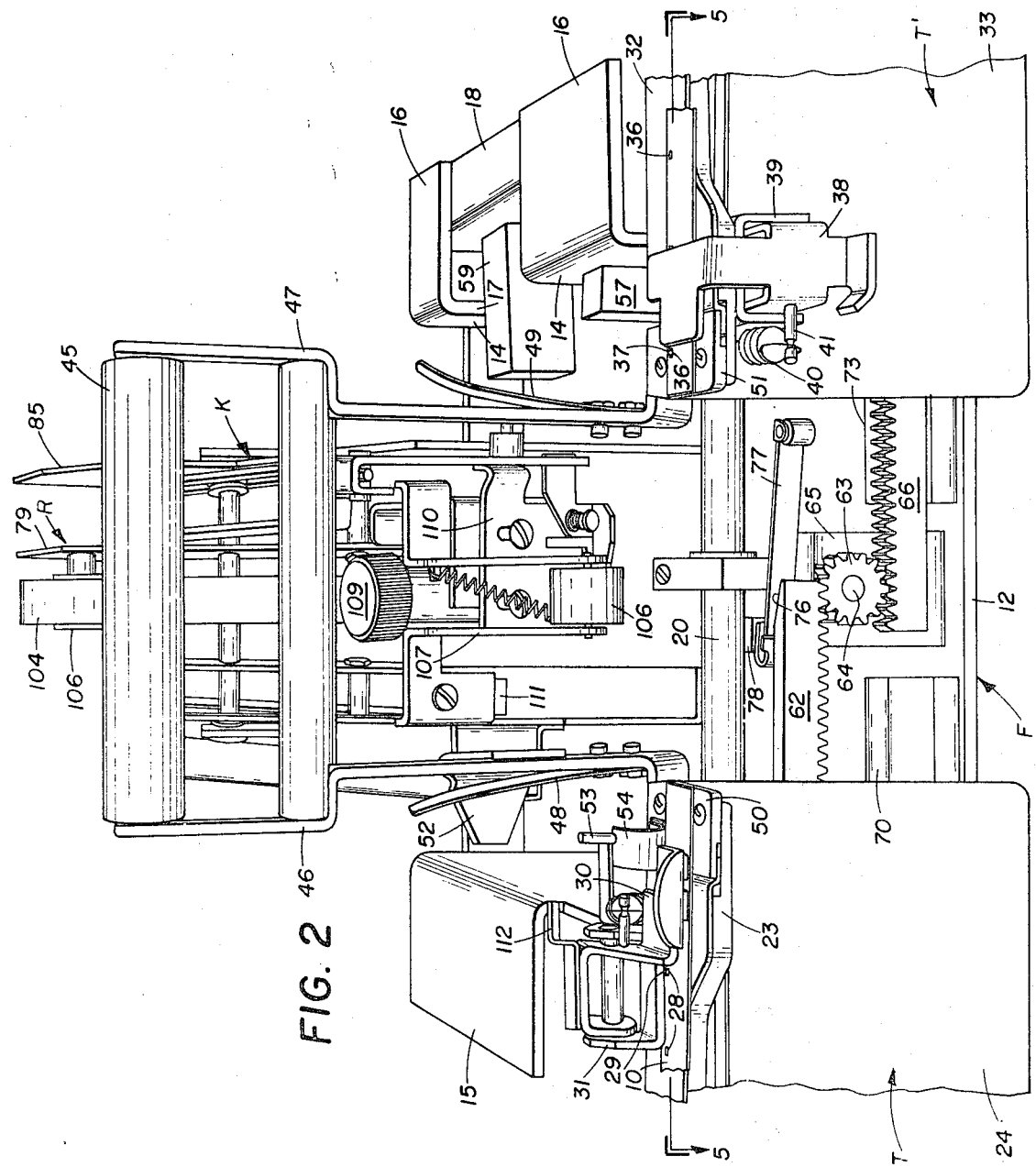
FIG. 2 is an enlarged front elevation of the strip-splicing device of FIG. 1, showing the tables in open position after the film strips have been cut.
Figure 3:
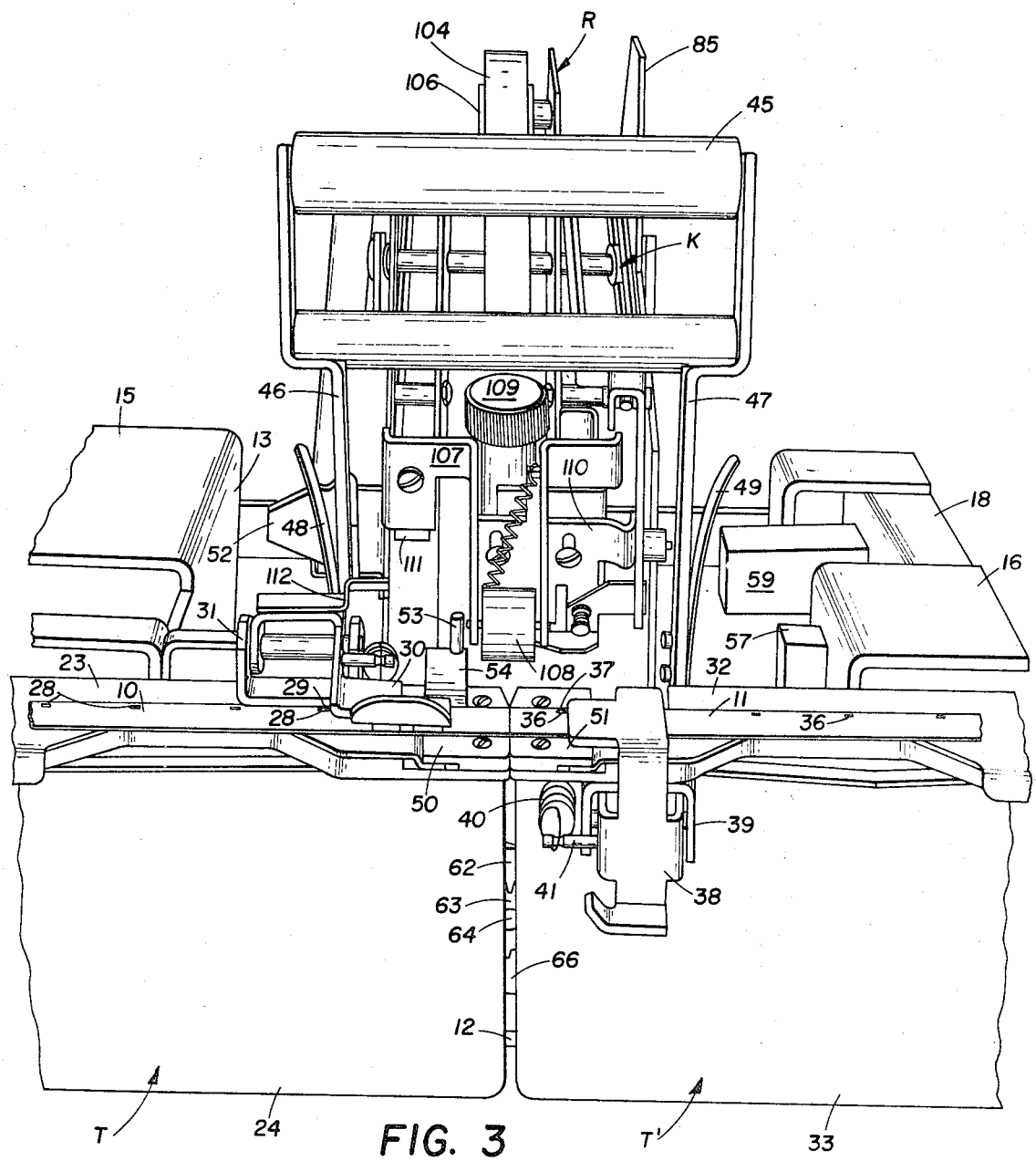
FIG. 3 is a front elevation, similar to FIG. 2, but showing the tables in closed position with the ends of the strips in abutting relationship prior to the application of a length of tape.
Figure 4:
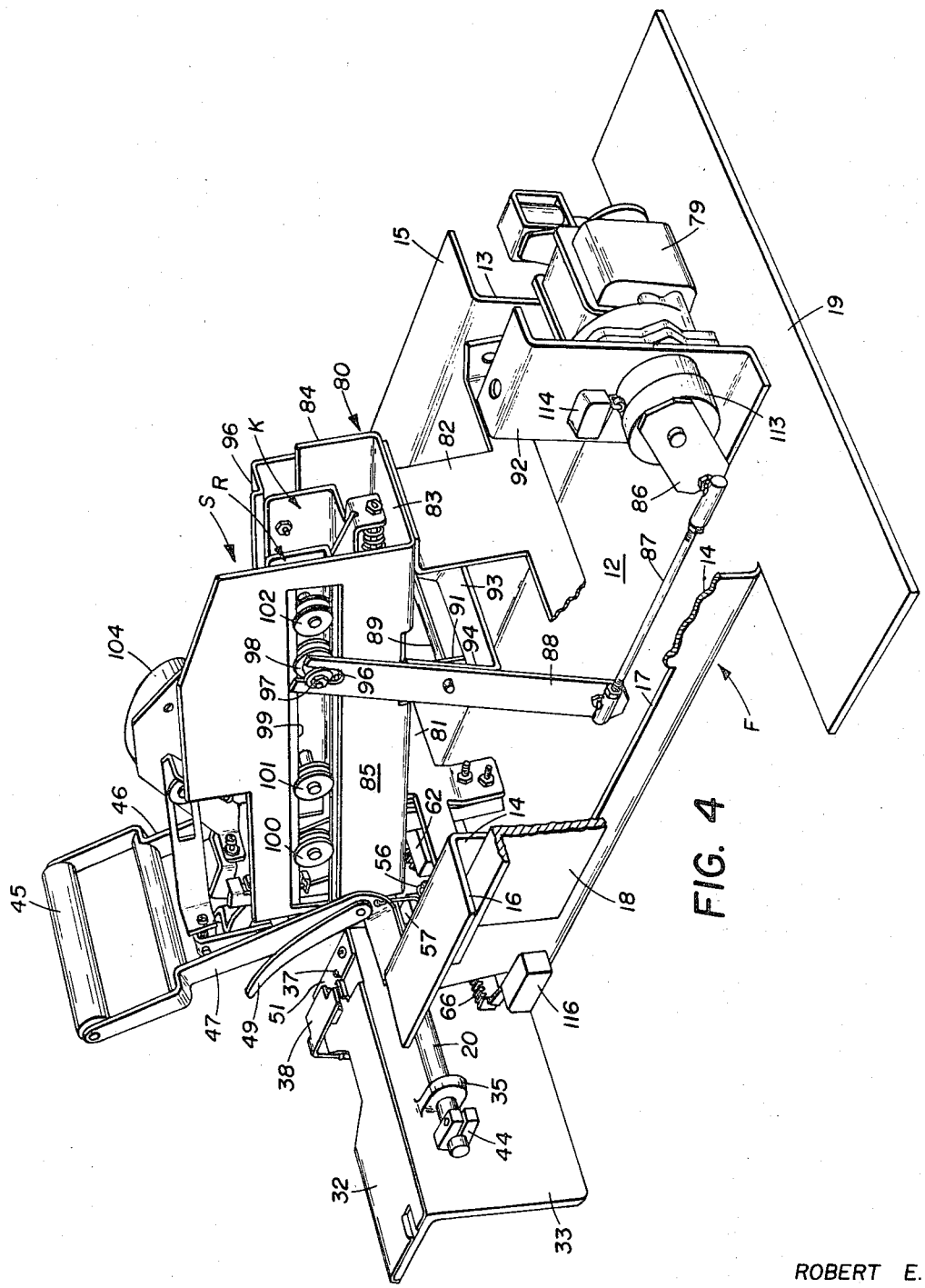
FIG. 4 is a rear perspective view of the film splicing device taken from the opposite side from FIG. 1, parts being broken away for clarity of illustration.
Figure 5:
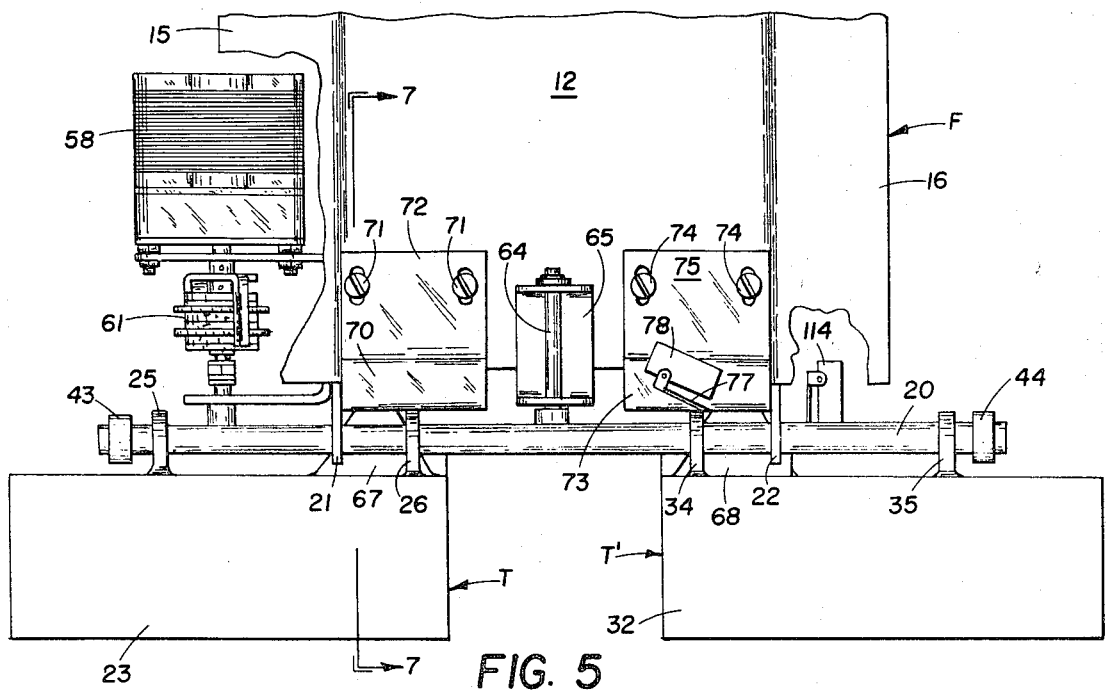
FIG. 5 is a horizontal section, taken along line 5—5 of FIG. 2, on slightly reduced scale and with parts omitted and broken away to show the details of the table drive mechanism.

As best seen in FIG. 4, the frame F may conveniently be formed from a single piece of material, such as sheet metal, having a base 12 integrally formed with sides 13 and 14 which terminate in outwardly extending flanges 15 and 16, respectively. Side 14 and flange 16 are provided with a notch 17 at the center thereof to provide room for associated parts. The ends of flange 16 are bridged, as best seen in FIGS. 2–4, by an angle 18 which provides a convenient mounting for other elements. The rear of base 12 terminates in a larger pedestal or support 19 upon which the tape-splicer drive motor is mounted as described below. As best seen in FIG. 5, tables T and T' are mounted on a transverse support rod 20 which is attached to flanges 21 and 22 on sidewalls 13 and 14, respectively. Supply table T includes a horizontal film support 23 which may be formed integrally with a vertical plate 24 along its inner edge and has a pair of spaced brackets 25 and 26 mounted thereon which are slidably received on support rod 20 so that the table may move back and forth thereacross. Film strip 10 is guided through notch 27 formed at the outer end of the table, shown in FIG. 1, and the leading edge thereof is positioned so that one of these sprocket holes 28 is received over a pin 29 located under a hinged clamp 30 which is advantageously hinged to horizontal support 23 by means of a U-shaped bracket 31. The clamp may be spring-biased to hold the film strip firmly against the table during the cutting, punching and splicing operations.

Likewise, take-up table T' includes a horizontal support 32 formed integrally with a vertical supporting plate 33 which has a pair of spaced brackets 34 and 35 attached thereto, as shown in FIG. 5, for mounting the table on support rod 20 for longitudinal movement therealong. A sprocket hole 36 at the trailing end of film strip 11 is received over a stationary pin 37, best shown in FIGS. 1 and 4, and a pivotal clamp 38 is swung from the open position of FIG. 3 to the closed position of FIG. 2 so that it engages the film to hold it in place, the clamp being pivotally mounted on a U-shaped bracket 39 connected to the underside of horizontal support 32. A coil spring 40 conveniently extends between the support 32 and a pin 41 on clamp 38 to hold the clamp toward either the closed or open position. The leading end of film strip 11 engages a flange 42 which may be formed as an upturned ear in support 32. The outward movement of tables T and T' is limited by split blocks 43 and 44 mounted on rod 20, as best seen in FIG. 5.

To initiate operation of the film splicer, handle 45 is pulled forward from a raised position and depressed to a cutting position. This handle is mounted between arms 46 and 47 which are pivoted to support rod 20 at their lower ends, as best seen in FIGS. 2, 4 and 5. Curved cutter blades 48 and 49 are conveniently attached to the outer sides of arms 46 and 47, respectively, and are adapted to cut the ends of the respective film strips 10 and 11 against stationary cutter members 50 and 51, mounted on plates 23 and 32, respectively. Conveniently, these cutter blades may be made of spring steel and curved so that resilient point contact is made between the blades and cutting members 50 and 51 as handle 45 is lowered.

During this movement, a punch plate 52, which is attached to arm 46, as in FIGS. 1–3, engages a punch 53 which is depressed to cut a notch in the edge of the film strip to form a sprocket hole. This punch 53 is slidably mounted in a bracket 54 provided with spring means (not shown) for urging punch 53 to its retracted position upon the raising of handle 45. Upon release, handle 45 is returned to its retracted position by means of a spring 55 connected between arm 46 and sidewall 13 of frame F, as in FIG. 1, and spring 46 connected between arm 47 and sidewall 14 of frame F, as in FIG. 4.

Figure 6:
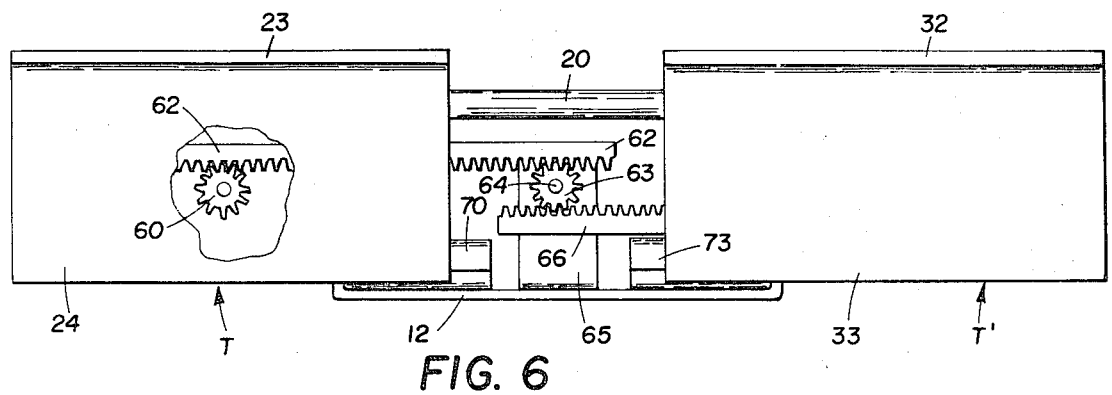
FIG. 6 is a front elevation of FIG. 5, with parts broken away to show further details of the table drive mechanism.

It is this movement which begins the automatic portion of the splicing operation by closing gang switch 57, shown in FIGS. 2–4 and 9, thereby completing the circuit to the table drive motor 58 and also through relay coil 59 for a purpose to be described. From FIG. 5, it can be seen that the tables are driven together by motor 58 which is mounted on frame F and is connected to gear 60 by means of slip clutch 61. As seen in FIG. 6, gear 60 engages the teeth on the bottom of rack 62 attached to table T. Pinion 63 is mounted on a horizontal shaft 64, seen in FIGS. 5–7, which is journaled in the upturned flanges of a bracket 65 attached to the center of base 12 of frame F. This pinion is turned by rack 62 which engages the top side thereof, and, in turn, drives rack 66 which is attached to table T' and engaging the bottom side of the pinion, thereby coupling the tables together so that they are driven together simultaneously.

Figure 7:
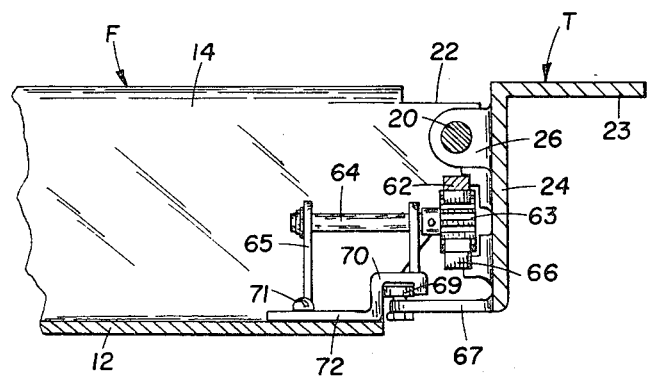
FIG. 7 is a vertical section, taken along line 7—7 of FIG. 5, showing details of rack and pinion and table mounting.

As seen in FIGS. 5 and 7, plates 24 and 33 of tables T and T' have inwardly extending flanges 67 and 68. Each of these flanges supports a roller mounted for rotation about a vertical axis, such as roller 69, shown in FIG. 7. The roller rides within channel-shaped guide rail 70 which is adjustably attached to base 12 of frame F, as by screws 71 extending through flange 72. A similar roller is mounted on flange 68 and rides within guide rail 73 adjustably attached to base 12, as by screws 74 extending through flange 75.

Figure 9:
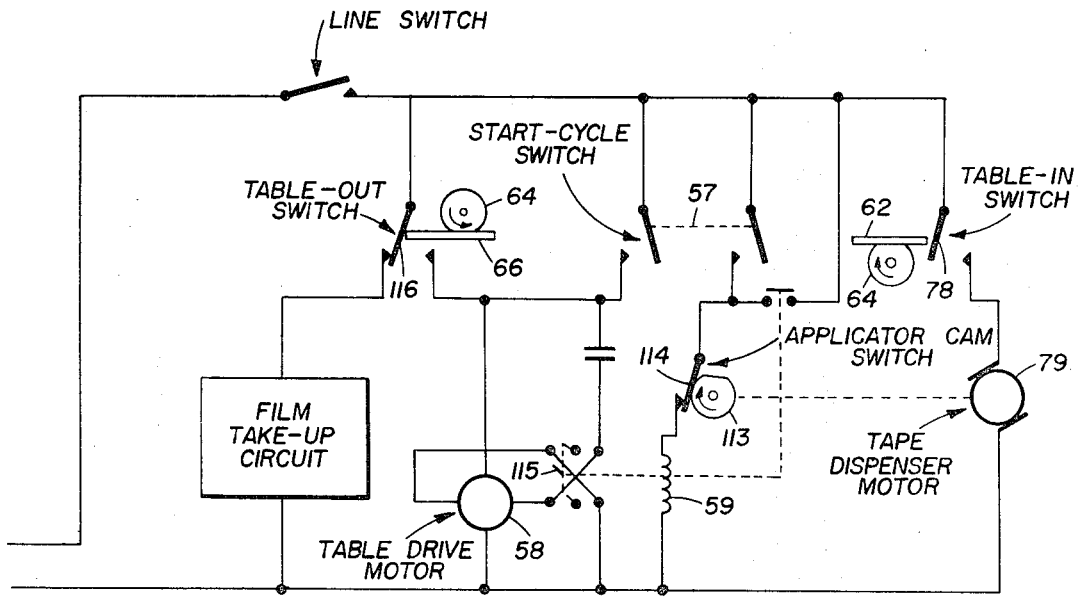
FIG. 9 is a diagram of a circuit which may be used in the mechanism of FIGS. 1–8.

As the tables come together to the position shown in FIG. 3, a cam surface 76 on the end of rack 62, as seen in FIG. 2, will engage the arm 77 of the table in switch 78. As seen in FIG. 9, the closing of switch 78 completes the circuit to the tape-dispenser motor 79 which drives the tape splicer S, as described below.

Figure 8:
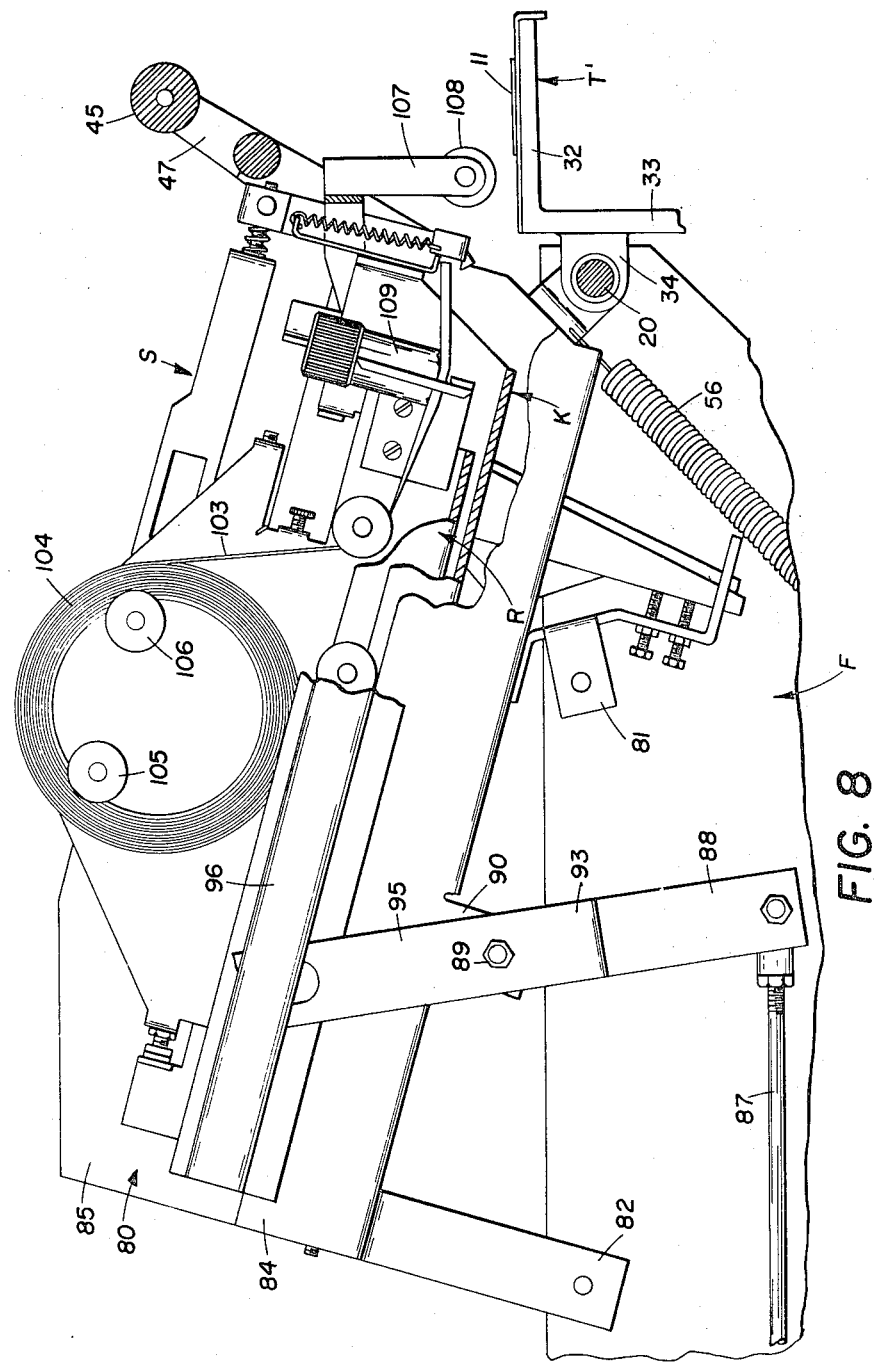
FIG. 8 is an enlarged, fragmentary, horizontal section, taken along line 8—8 of FIG. 1, showing details of the tape feed mechanism.

The tape splicer S includes a generally U-shaped support 80 mounted between sidewalls 13 and 14 of frame F by front and rear brackets 81 and 82, respectively, as best seen in FIGS. 4 and 8. Knife carriage K and tape-roll carriage R are mounted for relative movement within U-shaped support 80, which has a bottom wall 83 integrally formed with a relatively short left sidewall 84 and a relatively high right sidewall 85. As the cycle begins, both carriages are driven forward by motor 79, as shown in FIGS. 4 and 8, through bell crank 86, link 87, and a pivot arm 88 pivoted intermediate its ends on a pin 89 which extends through ears 90 and 91 depending from support 80. Motor 79 is conveniently attached to angle bracket 92 mounted on pedestal 19. A U-shaped member 93 has one arm 94 attached to pivot arm 88, as in FIG. 4, and the other arm 95 extends through housing 96 for moving the carriages forward and backward, as shown in FIGS. 1 and 8.

The upper end of pivot arm 88 has a notch 96' which receives collar 97 positioned outwardly of roller 98, supporting knife carriage K and the roll carriage R for movement along slot 99 by rollers 100, 101 and 102, as shown in FIG. 4. Corresponding rollers are provided which ride on the upper edge of wall 84 of U-shaped support 80 and are enclosed by housing 96.

As motor 79 turns, the tape 103 from roll 104, which is supported on two spaced spools 105 and 106, as in FIG. 1, is applied to the abutting ends of film strips 10 and 11 by applicator 107 attached to knife carriage K which drops down so that roller 108 presses the tape against the film strips and rolls thereacross due to the motion of the tape carriages securely affixing the end of the tape. Following the application of the tape to form the splice, the knife carriage K remains stationary for a short period of time while tape-roll carriage R moves rearwardly. Because the end of tape 103 is still being held against the film strips by roller 108, a length of tape is stripped from roll 104 to be used for the next splice. Conveniently, as the tape is stripped from the roll, it is pulled through a creasing device 109, which makes the extending length of tape stiff for feeding during the next cycle of the mechanism. Next, the tape is cut by a knife mechanism 110 next to the film strip. Then both carriages move rearwardly together. During this movement, an actuating plate 111 on applicator 107, as best seen in FIGS. 2 and 3, engages the end of an angular release plate 112 on clamp 30, to cause it to be pivoted from position of FIG. 3 to that of FIG. 2, thereby releasing film strip 10 and applicator 107 is raised after roller 108 affixes the trailing end of the cut tape to the film strips. At this point, cam 113, which is rotated by motor 79, as seen in FIGS. 4 and 9, reaches the cam relief so that applicator cam switch 114 breaks the circuit to relay coil 59, causing reversing switch 115 to reverse the direction of table drive motor 58 so that tables T and T' will be moved apart. Until this time, motor 58 continued to urge the tables together through slip clutch 61. This outward movement of the tables continues until the end of rack 66 engages table-out switch 116, as shown in FIG. 4, which breaks the circuit to the table drive motor and immediately may connect a film takeup circuit, as in FIG. 9, to the line so as to wind the now-spliced film strips 10 and 11 onto a film take-up reel (not shown). This take-up operation may be initiated by a switch (not shown) which is actuated by manually raising clamp 38.

From the foregoing, it can be seen that the novel features of this invention have been fulfilled to a marked degree. A mechanism has been invented which provides the overall combination of cutting the ends of two strips to be spliced, punching a sprocket hole in the strips, positioning ends of the strips, feeding and applying the tape, stripping the tape from a roll and crimping it for a subsequent feeding operation and cutting the tape. Also, the motor 58 is controlled by cutoff handle 45 to initiate its operation to cause tables T and T' to be moved together and held together through slip clutch 61. The movement of the tables together controls the cycling of the taping operation. Also, by mounting the tape roll on one movable carriage and the applicator and cutter on another carriage, a portion of tape may be stripped from the roll for the next subsequent splice near the completion of the current splicing operation. The apparatus is quite simple to operate and convenient to use.

The invention has been described in detail with particular reference to a preferred embodiment thereof, but it will be understood that variations and modifications can be effected within the spirit and scope of the invention as described hereinabove and as defined in the appended claims.

We claim:

1. An improved strip splicing device including a pair of tables for holding the ends of two strips to be spliced in abutting end-to-end relationship, said tables being movable between a separated position and a strip abutting position;
   drive means for moving said tables from one of said positions to the other of said positions; and
   an activatable tape applicator for applying tape to abutting ends of said strips;
   wherein the improvement comprises:
      cutter means movable between a spaced position and a cutting position for cutting the ends of said strips while said tables are in said separated position; and
      means responsive to movement of said cutter means from said cutting position to said spaced position for initiating said table drive means to move said tables to said abutting position.

2. A strip splicing device as set forth in claim 1, wherein activating means associated with said tape applicator is responsive to the movement of said tables together to activate said tape applicator.

3. A strip splicing device, as set forth in claim 1, wherein said table drive means includes:
   a motor;
   coupling means between said tables for moving them together or apart; and
   a clutch interconnecting said motor and said coupling means which is slippable when said tables are together so that said motor continues to run and maintains said tables in abutting relationship.

4. A strip splicing device, as set forth in claim 2, further including:
   means responsive to the movement of said tape applicator for reversing said table drive means at the end of a taping operation so that said tables are driven apart.

5. A strip splicing device, as set forth in claim 4, including:
   linkage means interconnecting said tape applicator and said applicator drive means;
   said responsive means being responsive to the position of said linkage means.

6. In a strip splicing device including:
   a frame;
   a pair of strip support tables mounted on said frame for movement between separated and abutting positions;
   a cutter mounted on said frame for cutting the ends of strips placed on said tables while said tables are separated; and
   a tape dispenser and applicator mounted on said frame for applying tape to the abutting ends of said strips when said tables are in abutting relation, the improvement comprising:
      drive means connected between said frame and said tables for moving said tables together or apart; and
      a clutch, forming part of said drive means, said clutch being slippable when said tables are in abutting relationship to hold them together under a positive force.

7. A strip splicing device, as set forth in claim 6, wherein said drive means further includes:
   a gear connected to said clutch;
   a first rack attached to one of said tables and in engagement with said gear;
   a pinion mounted on said frame between said tables and engaging one side of said first rack; and
   a second rack mounted on the other table engaging the other side of said pinion so that said tables are moved together and apart simultaneously by said drive means.

8. A strip splicing device, as set forth in claim 6, including:
   a switch connected in a circuit with said table drive means adapted to be closed by said cutter at the completion of a cutting operation to activate said drive means to move said tables together.

9. A strip splicing device, as set forth in claim 6, including:
   a motor for operating said tape applicator;
   linkage means interconnecting said motor and said tape applicator; and
   a switch connected in a circuit with said tape applicator motor which is closed by one of said tables as they come into abutting relationship, thereby activating said tape applicator motor to cause a piece of tape to be applied to said strips.

10. A strip splicing device, as set forth in claim 9, including:
    a reversing switch connected in a circuit with said table drive motor;
    means in said linkage means adapted to operate said reversing switch at the end of a taping cycle to reverse said table drive motor causing said tables to be driven apart.

11. A strip splicing device, as set forth in claim 10, wherein said operating means includes a cam.

12. A strip splicing device, as set forth in claim 10, including:
    a limit switch in a circuit with said table drive motor, adapted to be opened by one of said tables when said tables are fully separated.

13. A strip splicing device, comprising:
    a frame;
    first and second strip support tables;
    a generally horizontal rod mounted on said frame;
    means slidably mounting said tables on said rod for movement toward and away from each other;
    first and second racks attached to said first and second tables, respectively;
    a pinion mounted on said frame and engaging both said first and second racks to couple said tables together;
    a gear engaging one of said first and second racks;
    a table drive motor;
    a friction clutch interconnecting said table drive motor and said gear adapted to slip when said tables are together to hold them together under a positive force during a taping operation;
    a hand-operated cutter pivoted to said frame, having a pair of cutter blades adapted to cooperate with adjacent ends of the respective tape support tables when said tables are separated to cut off the adjacent ends of strips to be spliced;

resilient means connected between said cutter and said frame to pivot said cutter away from said tables after said strips have been cut;

activation means connected in circuit with said table drive motor engaged by said cutter when it pivots away from said tables to cause said drive means to move said tables into abutting relationship;

a tape dispenser and applicator mounted for movement transversely to the movement of said tables to apply a strip of tape to the abutting ends of said strips to form a splice;

a dispenser and applicator motor;

means connecting said dispenser and applicator motor to said dispenser;

switch means in circuit with said dispenser motor adapted to be closed by said tables as they come into abutting relationship to activate said dispenser and applicator motor so that said dispenser applies a strip of tape across the abutting ends of said strips;

reversing means in circuit with said table drive motor, said connecting means engaging said reversing means at the end of a tape-applying and dispensing cycle to reverse said table drive motor so that said tables are moved apart and said switch means is opened to terminate operation of said tape dispenser and applicator; and a limit stop in circuit with said table drive motor adapted to be enaged by one of said tables as the tables move away from each other to terminate operation of said table drive motor.

References Cited

UNITED STATES PATENTS

| 2,475,351 | 7/1949 | Castay | 156—506 |
| 2,516,602 | 7/1950 | Snyder | 156—507 |
| 3,461,022 | 8/1969 | Jorgensen | 156—505 |

BENJAMIN A. BORCHELT, Primary Examiner

D. A. HART, Assistant Examiner

U.S. Cl. X.R.

156—502